United States Patent
Otaki et al.

(10) Patent No.: US 6,607,578 B2
(45) Date of Patent: Aug. 19, 2003

(54) CONTINUOUS VACUUM REFINING METHOD OF MOLTEN METAL AND APPARATUS THEREOF

(75) Inventors: Mitsuhiro Otaki, Tokyo (JP); Kensuke Mori, Tokyo (JP)

(73) Assignees: Kobe Steel, Ltd., Hyogo (JP); Showa Denka K.K., Tokyo (JP); Sky Aluminum Co., Ltd., Tokyo (JP); Nippon Light Metal Company, Ltd., Tokyo (JP); The Furukawa Electric Co., Ltd, Tokyo (JP); Mitsubishi Aluminum Co., Ltd., Tokyo (JP)

( * ) Notice: Subject to any disclaimer, the term of this patent is extended or adjusted under 35 U.S.C. 154(b) by 0 days.

(21) Appl. No.: 09/990,179

(22) Filed: Nov. 21, 2001

(65) Prior Publication Data

US 2002/0121158 A1 Sep. 5, 2002

Related U.S. Application Data

(63) Continuation of application No. PCT/JP01/02505, filed on Mar. 27, 2001.

(30) Foreign Application Priority Data

Apr. 7, 2000 (JP) ......................................... 2000-107165

(51) Int. Cl.⁷ ................................................. C22B 9/04
(52) U.S. Cl. ............................. 75/414; 75/600; 75/678; 266/208
(58) Field of Search ........................ 75/414, 678, 600; 266/208

(56) References Cited

FOREIGN PATENT DOCUMENTS

| JP | 53-60805 | 5/1978 |
|---|---|---|
| JP | 59-157467 | 10/1984 |
| JP | 3-82593 | 8/1991 |
| JP | 6-322430 | 1/1994 |
| JP | 6-145831 | 5/1994 |
| JP | 8-311571 | 11/1996 |
| JP | 11-256251 | 9/1999 |
| JP | 411256251 A * | 9/1999 |

* cited by examiner

Primary Examiner—Melvyn Andrews
(74) Attorney, Agent, or Firm—Knobbe Martens Olson & Bear LLP

(57) ABSTRACT

A continuous vacuum refining method of molten metals, wherein impurities in the molten metal are eliminated by evaporation by stirring the molten metal (1) in the molten liquid stirring part B in the evacuated and pre-heated vacuum chamber, the molten liquid is transferred from the stirring part B to the tapping part C in the chamber through connecting holes, the molten liquid is continuously guided into the vessel in the refined molten liquid recovery chambers (10a), (10b) through the recovery passageways (8a), (8b) connected to the tapping part C, the recovery chamber being evacuated and connected with the passageway, and the refined molten liquid (9) is recovered after returning the pressure to the atmospheric pressure, wherein the molten liquid is discharged using plural passageways and plural recovery chambers connected with the respective passageways with alternating the recovery chamber. An apparatus employed for this method.

14 Claims, 8 Drawing Sheets

Sectional view

Sectional view

Plane view

Sectional view

Plane view

Molten liquid fall-down pipe

Molten liquid fall-down nozzle

Sectional view

Plane view

Sectional view

Plane view

Sectional view

Plane view

CONTINUOUS VACUUM REFINING METHOD OF MOLTEN METAL AND APPARATUS THEREOF

This is a continuation of PCT Application PCT/JP01/02505, filed Mar. 27, 2001. The prior PCT application was not published in English under PCT Article 21(2).

TECHNICAL FIELD

The present invention relates to a continuous vacuum refining method for recycling scraps of metals, in particular aluminum alloy scraps, into wrought materials or the like by eliminating impurity metallic elements, such as Zn and Mg that have high vapor pressures, and gas components such as hydrogen from the molten liquid of the metals, and an apparatus utilizable for these purposes.

BACKGROUND ART

As a method for effectively utilizing resources, recycling of various kinds of scrap materials has become an important problem. However, impurity elements should be often eliminated before recycling. For example, Zn must be eliminated for recycling of steel sheets plated with Zn. Harmful elements such as Bi, Pb and Cd should be eliminated for recycling copper scraps.

In the case of aluminum materials for automobiles, for example as a tube for flowing a refrigerant into an aluminum radiator, a three-layer composite material in which a filler alloy is used on one surface of a core alloy, and a sacrificial anode material is clad on the other surface of the core is used. Further a material formed by flame-spraying Zn on the surface is used as the aluminum materials of the tube or the like. Since separation of composite layers themselves from the scrap materials generated in the manufacturing process of the tubes is difficult, the composite materials themselves as low-grade scraps are used as raw materials of cast aluminum and deoxidizing materials for molten steel. In addition, since disassembling of the scrap of the aluminum radiator (as waste disposals) takes much labor, it is used as a low-grade scrap without applying any additional processing. Most of other aluminum scraps are also recycled by similar method as the radiator.

However, most of alloys prescribed in JIS-3000 mainly used as the core material of the tube and alloys prescribed in JIS-4000 mainly used as the filler alloys contain Zn and Mg, and alloys prescribed in JIS-7072 used as a sacrificial anode material contain Zn. The aluminum alloys or aluminum alloy composite materials containing Zn and Mg as principal ingredients are also used for fins and header plates as the other constitution materials of the radiator.

Since a large quantity of Zn and Mg are contained as elements of an alloy in the radiator made of aluminum, recycling of the scraps of the tube and radiator as the raw materials of the core alloy, filler alloy and fin will become possible when a refining technology for eliminating these alloy elements is developed. As a result, reduction of material costs as well as consumption of resources will be realized.

A vacuum processing method has been known in the art as a method for eliminating impurity elements in the molten metal, and various refining method taking advantage of this technology has been proposed.

As shown in FIG. 7 in the method disclosed, for example, in JP-A-06-145831 ("JP-A" means unexamined published Japanese patent application), the molten liquid (33) introduced into a airtight type refining furnace (32) from a holding furnace (31) is treated in a vacuum atmosphere directly or with stirring, thereby allowing the impurity elements such as Zn and Mg contained in the molten liquid in layer proportion to evaporate. These evaporated impurity elements are recovered by re-melting in the same vessel after solidification by cooling.

However, since the conventional method is a so-called batch method by which a large quantity of the molten liquid is treated using a large scale furnace, it involved the following problems: (1) a wide installation space is required; (2) a large capacity evacuation facility is necessary for evacuating the space in the large size furnace, besides requiring a large size stirring device for effective mechanical stirring of the large quantity of the molten liquid, thereby forcing much facility cost; (3) the evacuation apparatus becomes larger for maintaining a required degree of vacuum when a stirring effect is achieved by blowing an inert gas into the molten liquid; and (4) much time and large amount of resources are lost for pressure reduction and restoration processes.

The inventors of the present invention have developed, through intensive studies for solving the foregoing problems, a continuous vacuum refining method and an apparatus thereof that can exhibit an excellent refining ability with low cost, and have disclosed the results in JP-A-11-256251. This method and apparatus shown in FIGS. 8 and 9 are quite remarkable in that a molten liquid (41) melted under an atmospheric pressure is introduced into an evacuated vessel (43), and a refined molten liquid is continuously discharged from the evacuated vessel while stirring with a stirrer (44) and recovered into a refined molten liquid recovery chamber (50) placed under an atmospheric pressure outside of the evacuated chamber. In FIGS. 8, 9A and 9B, the reference numeral (42) denotes a conduit pipe, the reference numeral (45) denotes a molten liquid feed pipe, the reference numeral (46) denotes an impurity vapor recovery part, the reference numeral (47) denotes an evacuation apparatus, and the reference numeral (49) denotes a refined molten liquid.

However, the elevation of the molten liquid column arising from the differential pressure reaches about 5 m particularly in the aluminum or magnesium alloys having a small specific gravity, since the molten liquid refined by the method described above is withdrawn under an atmospheric pressure. Accordingly, the method still involves some improvements regarding construction expenses (including foundation construction costs) and maintenance of facilities.

Other and further features and advantages of the invention will appear more fully from the following description, take in connection with the accompanying drawings.

BRIEF DESCRIPTION OF THE DRAWINGS

FIG. 1(a) and FIG. 1(b) illustrate one embodiment of the apparatus according to the present invention, wherein FIG. 1(a) shows a cross-sectional side view cut along the line 1A—1A in FIG. 1(b), and FIG. 1(b) shows a partial cross-sectional plane view cut along the line 2B—2B in FIG. 1(a).

FIGS. 2(a) and 2(b) illustrate another embodiment of the apparatus according to the present invention, wherein FIG. 2(a) shows a cross-sectional side view along the line 2A—2A in FIG. 2(b), and FIG. 2(b) shows a partial cross-sectional plane view along the line 2B—2B in FIG. 2(a).

FIGS. 4(a) and 4(b) illustrate another embodiment of the method and apparatus according to the present invention, wherein FIG. 4(a) shows a cross-sectional side view along the line 4A—4A in FIG. 4(b), and FIG. 4(b) shows a partial cross-sectional plane view along the line 4B—4B in FIG. 4(a).

FIGS. 5(a) and 5(b) illustrate a still other embodiment of the method and apparatus according to the present invention, wherein FIG. 5(a) shows a cross-sectional side view along the line 5A—5A in FIG. 5(b), and FIG. 5(b) shows a partial cross-sectional plane view along the line 5B—5B in FIG. 5(a).

FIGS. 6(a) and 6(b) illustrate a further embodiment of the method and apparatus according to the present invention, wherein FIG. 6(a) shows a cross-sectional side view along the line 6A—6A in FIG. 6(b), and FIG. 6(b) shows a partial cross-sectional plane view along the line 6B—6B in FIG. 6(a).

DISCLOSURE OF THE INVENTION

Figure 1A:
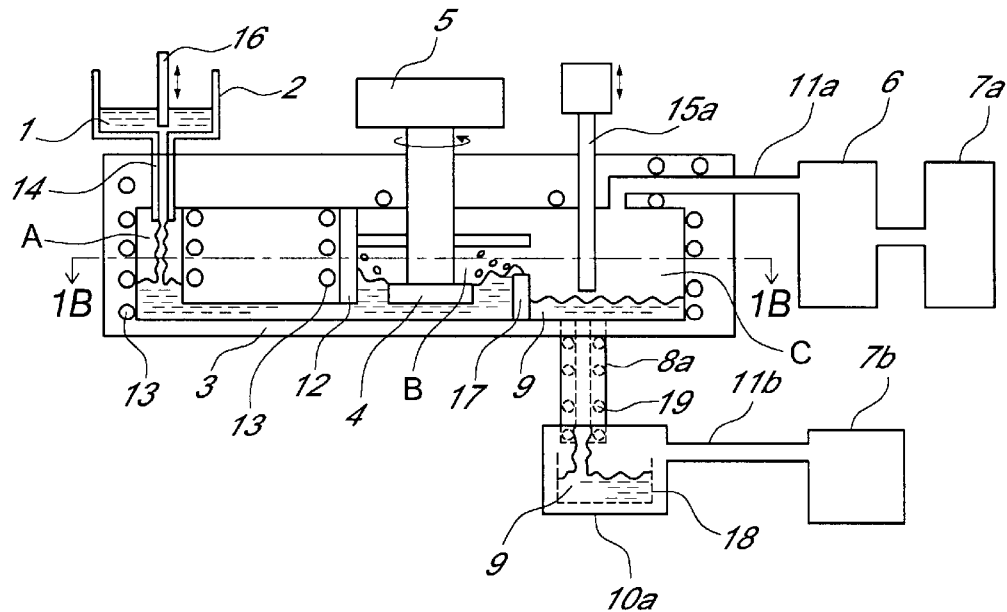

The inventors of the present invention have improved the conventional method and apparatus as hitherto described, and have investigated various methods for continuously recovering refined molten liquids, in particular a refined molten liquid having a small specific gravity. As a result, the investigators have found that it is important for the improvement described above to provide a plurality of evacuated molten liquid recovery chambers, to alternately switch discharge vessels from a refine processing chamber, and to recover the refined molten liquid discharged into vessels provided in the refined molten liquid recovery chamber after restoring the pressure to the atmospheric pressure. The inventors have completed the present invention based on this discovery.

The present invention provides the following means.

(1) According to the continuous vacuum refining method of molten metals in the present invention, impurities in a molten metal are eliminated by evaporation by stirring the molten metal at a molten liquid stirring part B in a vacuum chamber that has been previously evacuated and heated. Then, the molten liquid is fed into a molten liquid tapping part C in the vacuum chamber from the molten liquid stirring part B through a connecting hole. The molten liquid is then continuously discharged into a vessel in an evacuated refined molten liquid recovery chamber connecting to a recovery passageway through the recovery passageway connected to the molten liquid tapping part C for recovering the refined molten metal after returning the pressure to an atmospheric pressure. In this method, a plurality of the passageways for recovery and a plurality of the refined molten liquid recovery chambers connected to respective recovery passageways are provided, and the refined molten liquid recovery chambers for discharging the molten liquid through the recovery passageway are alternately switched.

(2) The continuous vacuum refining method of molten metals according to item (1), wherein the molten metal is continuously introduced into a molten liquid receiver A in a vacuum chamber, followed by continuously feeding the molten liquid into the molten liquid stirring part B from the molten liquid receiver A through a connecting hole.

(3) The continuous vacuum refining method of molten metals according to item (1) or (2), wherein the refined molten liquid recovery chamber is evacuated to the same vacuum pressure as the vacuum pressure in the vacuum chamber at the time of discharging the molten liquid.

(4) The continuous vacuum refining method of molten metals according to item (1), (2) or (3), wherein the molten metal comprises scraps of an aluminum alloy or scraps of a magnesium alloy.

(5) The continuous vacuum refining method of molten metals according to any one of items (1) to (4), wherein the molten liquid is stirred using a stirrer at the molten liquid stirring part B.

(6) The continuous vacuum refiner of molten metals comprising: a molten liquid receiver A for temporarily retaining a molten liquid introduced into a vacuum chamber provided with a preheating means outside of the vacuum chamber, through a molten liquid fall-down port; a molten liquid stirring part B having a means for allowing the molten liquid to temporarily retain and to be stirred, and disposed so that the molten liquid communicates between the molten liquid receiver A and the molten liquid stirring part B to each other; and a molten liquid tapping part C disposed so that the molten liquid in the molten liquid stirring part B communicates with the molten liquid tapping part C, wherein a weir is provided for allowing the molten liquid in the molten liquid stirring part B to overflow into the molten liquid tapping part C, and a plurality of molten metal recovery pipes, which transfer the overflowed molten liquid from the molten liquid tapping part C into respective temporarily retaining vessels of the molten liquid in plural molten liquid recovery chambers placed at the outside of the vacuum chamber, are provided with their lower open ends being within the molten liquid in the vessels, each of the molten liquid recovery pipe switching the refined molten liquid recovery chambers for discharging the molten liquid by providing stoppers for ON-OFF control of the flow speed of the molten liquid, and an evacuation apparatus is being connected to the vacuum chamber and refined molten liquid recovery chamber.

(7) The continuous vacuum refiner of molten metals according to item (6), wherein the vacuum chamber comprises an opening port provided at the upstream side of the molten liquid stirring part B in place of the overflow weir, an opening port, which is located at a higher position from the upstream side opening port and is provided on side walls at the downstream side, and a vessel having a cover on at least a part of the upper face thereof.

(8) The continuous vacuum refiner of molten metals according to item (6) or (7) comprising a stirrer as a stirring means of the molten metal in the molten liquid stirring part B.

(9) The continuous vacuum refiner of molten metals according to item (8) comprising a means for introducing an inert gas into the molten metal in the vicinity of the bottom side of the stirrer.

(10) The continuous vacuum refiner of molten metals according to any one of items (6) to (9) comprising a porous refractory material on the bottom of the molten liquid stirring part B, and a means for introducing an inert gas into the molten metal through the porous refractory material.

(11) The continuous vacuum refiner of molten metals according to any one of items (6) to (10) comprising a molten metal feed pipe in place of a molten metal fall-down port for the molten liquid receiver A.

(12) The continuous vacuum refiner of molten metals according to any one of items (6) to (11), wherein the molten metal comprises an aluminum alloy scrap or a magnesium alloy scrap.

(13) The continuous vacuum refiner of molten metals according to any one of items (6) to (12) provided with a radiant tube heater as a heating means in the molten metal stirring part B.

(14) The continuous vacuum refiner of molten metals according to any one of items (6) to (13), wherein at least one material selected from silicon nitride, graphite and silicon carbide is used for a stopper.

In the present invention as described above, the "upstream side" refers to the molten liquid receiver A side of the molten liquid stirring part B and the "downstream side" refers to the molten liquid tapping part C side of the molten liquid stirring part B.

BEST MODE FOR CARRYING OUT THE INVENTION

The present invention will be further described hereinafter.

The apparatus to be used for the continuous vacuum refining method of the molten metals according to the present invention is described at first.

The refined molten liquid recovery chamber in the apparatus according to the present invention is preferably evacuated at a pressure lower than the atmospheric pressure during discharge of the molten metal. It is particularly preferable that the pressure in the refined molten liquid recovery chamber is reduced to the same pressure as the vacuum chamber for commonly using an evacuation apparatus between the two chambers while restricting the height of the apparatus.

Although any metals may be used as the molten metals in the apparatus according to the present invention, a molten liquid column due to a differential pressure between the molten liquid and atmospheric pressure is hardly generated by reducing the pressure of the refined molten liquid recovery chamber during discharge of the molten metal, even when an alloy having a small specific gravity such as an aluminum alloy or a magnesium alloy is used, thereby enabling the height of the apparatus to be reduced. The apparatus according to the present invention is particularly effective as a refining apparatus of the aluminum alloy scrap that yield a large amount of gases, since the aluminum alloy scrap generates a larger amount of hydrogen than usual one and the apparatus according to the present invention has a remarkable degassing effect.

While a gas-bubbling method using an inert gas or a mechanical stirring method using a stirrer may be used as the stirring methods in the molten liquid stirring part B in the apparatus according to the present invention, the mechanical stirring method using the stirrer is particularly effective for compatibility of reduction of loads on the evacuation system and improvement of refining efficiency of the molten metal. It is preferable to form gas bubbles as fine as possible in order to reduce the consumed quantity of the inert gas as small as possible. The preferable methods include a method for introducing the inert gas through a porous filter, and a method of stirring the introduced inert gas by using a stirrer simultaneously with introduction.

Examples of the stirring means in the molten liquid stirring part B in the apparatus according to the present invention include, in addition to the method of using the stirrer and inert gas, a method of providing a stirrer together with an inert gas feed device in the vicinity of the bottom side of the stirrer to stir the molten liquid by allowing the stirrer to rotate while introducing the inert gas, and a method of introducing the inert gas into the molten metal through a porous refractory material provided at the bottom of the molten liquid stirring part B for stirring the molten liquid. It is particularly preferable to maintain the reduced pressure in the vacuum chamber and to provide the chamber with the stirrer.

A baffle plate having opening ports is preferably provided at the upstream side of the molten liquid stirring part B for suppressing adhesion of liquid drops as a result of stirring, when the molten liquid is mechanically stirred with the stirrer in the apparatus according to the present invention.

It is effective for ensuring a processing time to continuously transfer the molten liquid fed into the molten liquid receiver A to the molten liquid stirring part B, followed by transferring the molten metal from the molten liquid stirring part B to a recovery passageway or a molten metal recovery pipe by allowing the molten liquid to overflow. The processing time is preferably 1 second or more, more preferably 10 seconds or more, and further preferably 30 seconds or more. For compatibility between the refining efficiency and processing time, the molten metal is continuously introduced into the molten liquid stirring part B from the opening port provided at the bottom at the upstream side of the molten liquid stirring part B, followed by discharging the molten liquid from the opening port at the downstream side at a higher position from the upstream side opening port by taking advantage of mechanical centrifugal force generated by the stirrer, in place of allowing the molten liquid to overflow from the molten liquid stirring part B to the molten liquid tapping part C. This method is also effective for ensuring a residence time of the molten liquid in the processing chamber.

The residence time of the molten liquid can be ensured by allowing the molten liquid to overflow, by providing an overflow weir between the molten liquid stirring part B and molten liquid tapping part C in the apparatus according to the present invention. A vessel (tank) may be provided in the vacuum chamber in place of the overflow weir, wherein the vessel has an opening port at the upstream side of the molten liquid stirring part B and another opening port at a higher position than the upstream side opening port on a downstream side wall opposed to the upstream side and wherein the vessel is covered partly, in order to ensure a residence time of the molten liquid in the vessel while allowing upwardly scattered the molten metal by stirring to effectively reside in the vessel.

It is also preferable in the apparatus according to the present invention to make up a plurality of the vacuum chamber, or to make up a plurality of molten metal stirring part B in the vacuum chamber.

While the vessel of the molten liquid stirring part B in the apparatus according to the present invention may be circular or rectangular, splashes due to collision of the molten metal at the edge portions are more evidently generated in the rectangular shape. Accordingly, the rectangular shape is particularly effective because the refining efficiency is improved since the surface area of the molten metal drops in the vacuum atmosphere increases. Owing to generation of splashes, it is preferable for maintenance of the apparatus that at least the inner wall face of the molten liquid stirring part B is made of a material having poor wettability with the molten metal (for example graphite).

While the molten metal is fed into the molten liquid receiver A from the outside of the vacuum chamber, either a molten metal fall-down port for allowing the molten metal to fall down into the molten liquid receiver A, or a molten liquid feed pipe (a molten liquid fall-down pipe) or a feed nozzle (fall-down nozzle) may be provided in the apparatus according to the present invention.

The molten liquid stirring part B is heated by a conventionally used heating means in the apparatus according to the present invention. While the heating means includes, for example, a ceramic module heater in which a resistor heater is embedded in a ceramic fiber and is actuated at a low voltage, a radiant tube heater is particularly preferable since it can directly heat the inside of the vacuum chamber having lining on the inner face of the vacuum chamber by penetrating through the refractory material.

The molten metal recovery pipe communicating the refined molten liquid recovery chamber comprises an ON-OFF control mechanism (a stopper) of the flow rate of the molten metal in the apparatus according to the present invention, in order to discharge the refined molten liquid with switching into vessels in a plurality of the refined molten liquid recovery chambers. The preferable material of the stopper includes dense and mechanically strong materials such as ceramics like silicon nitride and silicon carbide, and graphite. While the stopper is actuated by hydraulic, pneumatic and electrical means, a method using an air cylinder is safer and economically advantageous considering a high temperature radiation.

The molten metal is discharged from the molten liquid tapping part C into a vessel (a molten liquid recovery vessel) in the plural refined molten liquid recovery chamber placed at the outside of the vacuum chamber through independently connected molten metal recovery pipes in the apparatus according to the present invention. The stopper for ON-OFF control of the flow rate of the molten metal is provided at the molten metal recovery tube, and the evacuation apparatuses are connected to respective vacuum chambers and refined molten liquid recovery chambers. Then, the molten liquid is discharged from the vacuum chamber into the vessels in the refined molten liquid recovery chambers (one or more chambers of the plural recovery chambers) by appropriately switching the recovery chamber. Weight changes of the refined molten liquid recovery vessel are monitored, for example, with molten liquid tapping time or with a load cell, and the vessels are switched at a time when a prescribed weight of the molten liquid has been discharged.

The feed weight of the molten metal is determined by the discharge speed that is determined by the differential pressure between the vacuum chamber and the refined molten liquid recovery chamber, and by the diameter of the molten metal fall-down port or molten metal feed pipe. Consequently, a continuous processing is enabled by controlling the diameter of the molten metal fall-down port or the molten metal feed pipe, and the diameter of the molten metal recovery pipe, so that the weight of the molten metal flowing onto the vacuum chamber and the weight of the discharged molten metal balance with each other. While the size of the molten metal recovery pipe may be changed for controlling the diameter, it is preferable to prepare several nozzles having different diameters, and a nozzle corresponding to a requited condition is attached to the molten liquid recovery pipe. The nozzle is preferably made of the same material as the stopper.

Since the differential pressure between the refined molten liquid recovery chamber and vacuum chamber becomes larger as the reduced pressure of the refined molten liquid recovery chamber comes close to the atmospheric pressure during discharge of the molten liquid, the elevation of the molten liquid column increases. Therefore, the pressure in the refined molten liquid recovery chamber is preferably adjusted to be equal to or a somewhat more reduced than the pressure in the vacuum chamber. It is particularly preferable to adjust the reduced pressure in the vacuum chamber to be equal to the pressure in the molten liquid recovery chamber for commonly using an evacuation apparatus between the two chambers.

The molten metal temporarily pooled in the refined molten liquid recovery vessels in the refined molten liquid recovery chamber by sequentially switching the vessel is promptly recovered as a refined molten liquid after returning the pressure to the atmospheric pressure in the apparatus according to the present invention. While a method for switching the reduced pressure with a vacuum valve by commonly using the evacuation apparatus may be contemplated, it is preferable to connect the vacuum chamber to the evacuation apparatus independently from the refined molten liquid recovery chamber for stable control of the reduced pressure. However, the molten liquid in the recovery vessel may be recovered by returning the pressure to the atmospheric pressure after cooling and solidification of the molten metal in the same chamber, provided that a low productivity is acceptable. An iron vessel with a coating of an amorphous refractory material on the inner surface, or an iron vessel with a regular size assembled refractory material is preferable as the recovery vessel for reducing damages of the vessel by the molten liquid discharged from the molten liquid tapping part of the vacuum chamber. A vessel made of cast iron or ductile iron is preferably used for the molten liquid of the aluminum alloy.

Repeated use of the recovery vessel may be facilitated by promptly returning it into the refined molten liquid recovery chamber, when the basin of the molten metal in the recovery vessel in the refined molten liquid recovery chamber is pulled out of the chamber for example on a soil and the vessel is returned into the melting furnace after transferring the molten metal into a separately prepared vessel.

Impurity components evaporated in the vacuum chamber is recovered, on the other hand, at the upstream side (at the molten liquid tapping part C side) of the evacuation apparatus. Only the evacuation apparatus may be used when the impurities comprise only gas components as in the degassing process. However, it is preferable for protecting the evacuation system and for effectively recovering impurity elements such as Zn, Mg and utilizing them, that an impurity element recovery device provided with a water-cooling jacket is equipped at the upstream of the pipe of the evacuation apparatus to condense the impurity elements as solid materials on the cooled surface. The impurity elements are further recovered by providing a powder adsorption filter connected to the cooling jacket.

The apparatus in the present invention required no large scale processing furnace for processing a large volume of the molten liquid as sued in the conventional art. Only a processing chamber as a basin having a volume enough for allowing a small volume of the continuously transferred molten liquid to reside for a prescribed time is required. Therefore, no wide space for the processing chamber is not required besides making the stirrer small size. Since the space in the furnace becomes inevitably narrow, a small size evacuation apparatus may be used. A high stirring efficiency may be expected throughout the molten liquid, thereby enabling the facility cost to be reduced since blowing of the inert gas is not necessary as in the conventional method. Since the elevation of the molten metal column for maintaining a vacuum during the continuous processing is lowered, the facility cost (including the fundamental construction cost) as well as the maintenance cost and operation cost may be reduced.

Since the refined molten liquid is continuously recovered as described above in the apparatus according to the present invention, losses of time and resources are reduced by always maintaining the vacuum chamber in a reduced pressure state.

The continuous vacuum refining method of the molten metals according to the present invention comprises the steps of stirring the continuously fed molten metal in the vacuum chamber, eliminating impurities by evaporation, guiding the molten liquid into the evacuated refined molten liquid recovery chamber at the outside of the vacuum chamber to recover the molten metal after returning the pressure of the recovery chamber to the atmospheric pressure. A plurality of the refined molten liquid recovery chambers are provided, and the chambers are alternately switched so that the refined molten metal is discharged into one or more of the recovery chambers. The continuous vacuum refining methods are not particularly restricted, so long as the molten metal is continuously introduced into the pre-heated vacuum chamber under a reduced pressure to eliminate the impurities by stirring. The stirring methods include those that have been described as the stirring device in the present invention. While the temperature and reduced pressure of the vacuum chamber for the refining process of the present invention differ depending on the alloy as the object of refining, and the objective level of the impurity elements, a higher temperature and lower pressure are preferable. For example, the preferable conditions for eliminating Zn from the aluminum alloy at a level of 0.1 mass % or less preferably comprise a pressure of 50 Pa or less and a temperature of 850° C. or more, more preferably 900° C. or more. The preferable conditions for eliminating Zn from the aluminum alloy at a level of 0.5 mass % or less preferably comprise a pressure of 200 Pa or less and a temperature of 700° C. or more, more preferably 900° C. or more, and most preferably 850° C. or more. While the processing time in the vacuum chamber is not in particular restricted, and it may be appropriately determined depending on the composition of the molten liquid. The time is preferably 1 sec or more, more preferably 10 seconds or more, and further preferably 30 seconds or more. The processing time may be adjusted by providing and adjusting the overflow weir that has been described with respect to the apparatus according to the present invention.

Switching of the refined molten liquid recovery chamber for discharging the molten metal is carried out by providing a mechanism that is able to control flow-out of the molten metal in the recovery passageway connected to the molten liquid recovery chamber, for example the stopper of the molten metal recovery pipe in the apparatus according to the present invention. The refined molten liquid recovery chamber is evacuated during discharge of the molten metal, preferably at a reduced pressure below the atmospheric pressure, and the pressure in the refined molten liquid recovery chamber is preferably controlled to be equal to the pressure in the vacuum chamber.

Continuous vacuum refining processing of the molten liquid of any alloys is possible according to the method of the present invention, as described in the apparatus according to the present invention. The method of the present invention is particularly suitable for the alloy having a small specific gravity such as the aluminum alloy and magnesium alloy that is liable to form a high molten liquid column due to the differential pressure, or an alloy that generates a large quantity of scraps.

The method according to the present invention is applicable to the alloys that can be refined by a vacuum processing method without any restriction. For example, elimination of Cd, Na, Ca, Pb, In, Ag and Bi as well as Zn, Mg and hydrogen is possible when applied to the refining process of the molten aluminum alloy. Elimination of Cd, Na and Ca is possible from the molten magnesium alloy, and elimination of Al and Sn in addition to the foregoing elements Cd, Na, Ca, Pb, In, Ag and Bi is possible from the molten copper alloy. Furthermore, elimination of Cu in addition to elimination of Cd, Na, Ca, Pb, In, Ag, Bi, Al and Sn are possible from the iron alloy.

The method according to the present invention does not require a processing furnace having a scale as large as several tens tons as in the conventional methods enabling continuous refining operation with a small sized facility. Accordingly, the following industrially evident effects can be obtained:

(1) a narrow installation space is necessary;
(2) in the case of the aluminum alloy, the pit depth or the height of the building can be reduced to ⅓ of the conventional facilities, thereby suppressing the facility cost (including the foundation construction cost) low;
(3) time loss and resource loss are small;
(4) facility maintenance costs can be reduced; and
(5) the facilities are excellent in safety since necessity of high altitude works and pit works is reduced.

Since the continuous refining apparatus in the present invention is small size, the costs required for installation and maintenance of the apparatus are reduced to enable a continuous refining process to be performed with safety and suppression of time loss and resource loss.

EXAMPLES

The method according to the present invention is described in more detail hereinafter with reference to the drawings showing the preferred embodiments of the apparatus of the present invention, but the present invention is by no means restricted to these examples.

Example 1

Figure 1B:
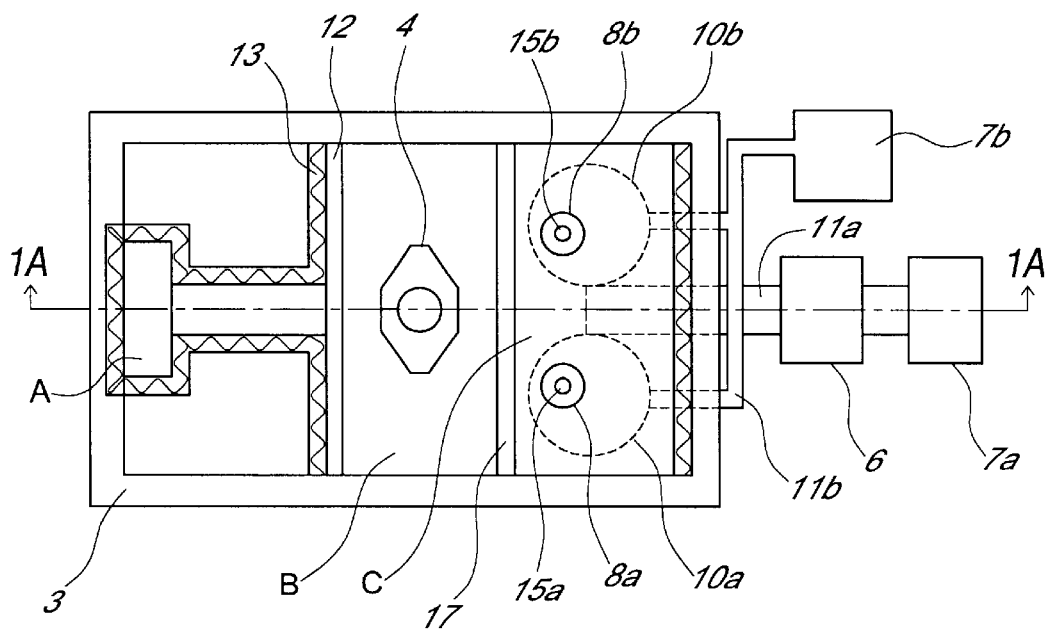

FIG. 1(a) and FIG. 1(b) illustrate one embodiment of the apparatus according to the present invention, wherein FIG. 1(a) shows a cross-sectional side view cut along the line S–S' in FIG. 1(b), and FIG. 1(b) shows a partial cross-sectional plane view cut along the line T–T' in FIG. 1(a).

With reference to FIG. 1, the molten liquid of the aluminum alloy (1) melted in a melting furnace (not shown) is transferred to a tundish (2). This tundish (2) may be a conduit. A molten liquid feed pipe (14) provided under the tundish (2) is designed not to allow the molten liquid to leak by previously closing a molten metal feed stopper (16). After allowing a prescribed quantity of the molten liquid to reside in the tundish (2), the stopper (16) is elevated to continuously feed the molten liquid into the molten liquid receiver A in a vacuum chamber (3) through the molten liquid fall-down pipe (14). The elevation of the molten liquid in the tundish (2) is determined by an on-line measurement with a sensor (not shown) to restrict the elevation within a given range.

For arbitrarily controlling the temperatures of the atmosphere in the vacuum chamber (3) and molten metal, a ceramic modules as a heater (13) is appropriately disposed. The inside of the vacuum chamber (3) is partitioned into three chambers of the molten liquid receiver A, molten liquid stirring part B and molten liquid tapping part C connected to the molten liquid recovery pipe (8a). The quantity of the molten liquid introduced into the vacuum chamber is controlled by the degree of the reduced pressure in the vacuum chamber and by the inner diameter of the molten liquid fall-down nozzles provided to the conduit.

A stirrer (4) made of graphite is attached at the molten liquid stirring part B by being connected to a stirring motor (5). A baffle plate (12) having an opening port at the bottom is provided between the molten liquid stirring part B and the molten liquid receiver A for stabilizing the elevation of the molten liquid and for suppressing splashes of the molten liquid from the molten liquid stirring part B. An overflow weir (17) is provided in the passageway from the molten liquid stirring part B to the molten liquid tapping part C. While the overflow weir is provided in the entire width in FIGS. 1(a) and 1(b), it may be formed as an opening port at a part of the wall.

The molten liquid tapping part C is independently connected to the plural refined molten liquid recovery chambers (10a) and (10b) through recovery tunes (8a) and (8b), and the refined molten liquid (9) is continuously recovered through these tubes. At first, the stopper (15b) is allowed to descend for blocking the molten liquid from being introduced into the recovery chamber (10b) to close the inlet of the recovery tube (8b). Then, the stopper (15a) ascends to feed the refined molten liquid into the recovery chamber (10a). When a prescribed quantity of the refined molten liquid is filled in the recovery chamber (10a), feed of the refined molten liquid into the recovery tube (8a) is stopped by descending the stopper (15a). subsequently, feed of the refined molten liquid is switched to the molten liquid recovery chamber (10b) by ascending the stopper (15b) to open the recovery tube (8b). The refined molten liquid recovery chamber (10a) is returned to the atmospheric pressure thereafter, and the refined molten liquid recovery vessel (18) is taken out by opening a door (not shown) on a rail. After discharging the refined molten liquid in the vessel into another vessel, the refined molten liquid recovery vessel is returned to the refined molten liquid recovery chamber (10a), the door is closed, and the chamber is evacuated to a prescribed pressure. Subsequently, the stopper (15b) descends when a prescribed weight of the molten liquid is pooled in the refined molten liquid recovery chamber (10b), and feed of the refined molten liquid to the recovery tube (8b) is stopped. The molten liquid in the molten liquid tapping part C can be continuously recovered by repeating the processes as described above.

While the refined molten liquid recovery pipe (8a) and (8b) are constructed by winding a sheath-shaped heater (19) around the outer circumferential surface of a graphite pipe which is inserted into a metal pipe, the tip portion of the heater remains open by directly inserting the graphite pipe itself into the refined molten liquid recovery chamber. Although the tip portion of the graphite pipe is placed at a higher position from the molten liquid to drop molten liquid, the graphite pipe open may directly inserted into the refined molten liquid in the refined molten liquid recovery vessel in the recovery chamber.

A ventilation pipe (11a) is attached on the side wall of the vacuum chamber, and the pipe is connected to an evacuation apparatus (7a) via an impurity vapor recovery part (6). A water-cooling jacket is provided in the impurity vapor recovery part (6), and the impurities are recovered by allowing them to solidify on the surface of the jacket. Another ventilation pipe (11b) is also attached on the side walls of the refined molten liquid recovery chambers (10a) and (10b), and is connected to an evacuation apparatus (7b). The pressure recovery and reduction operations are performed by switching a vacuum valve (not shown) attached to the ventilation pipe (11b) for switching the refined molten liquid recovery chambers. Although the ventilation pipe (11b) of the refined molten liquid recovery chamber is connected to the evacuation apparatus (7b) independently from the evacuation apparatus (7a) in FIGS. 1(a) and 1(b), it is also possible to commonly connect them to the evacuation apparatus (7a) and restore/reduce the pressure by switching the vacuum valve. Independent evacuation apparatuses may be connected to respective refined molten liquid recovery chambers.

Figure 2A:
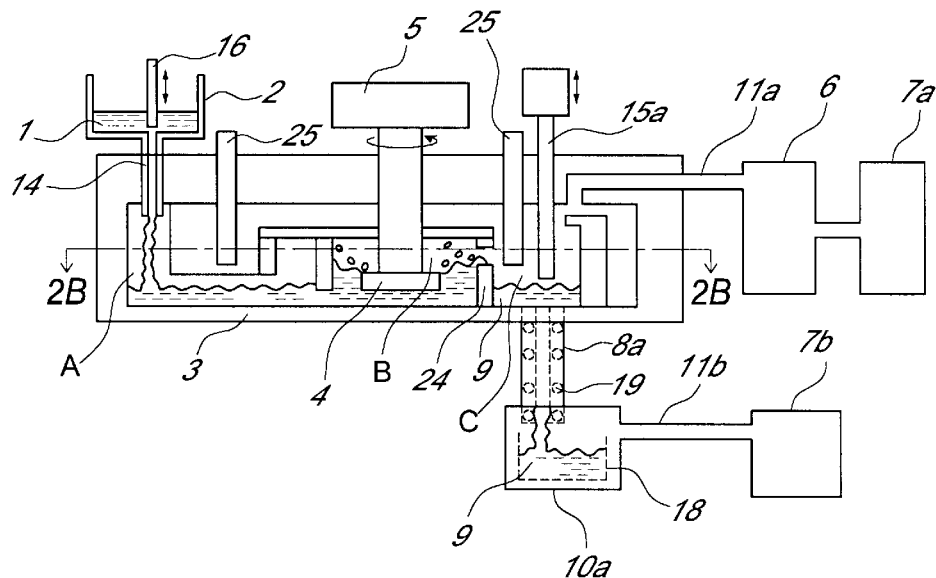
Figure 2B:
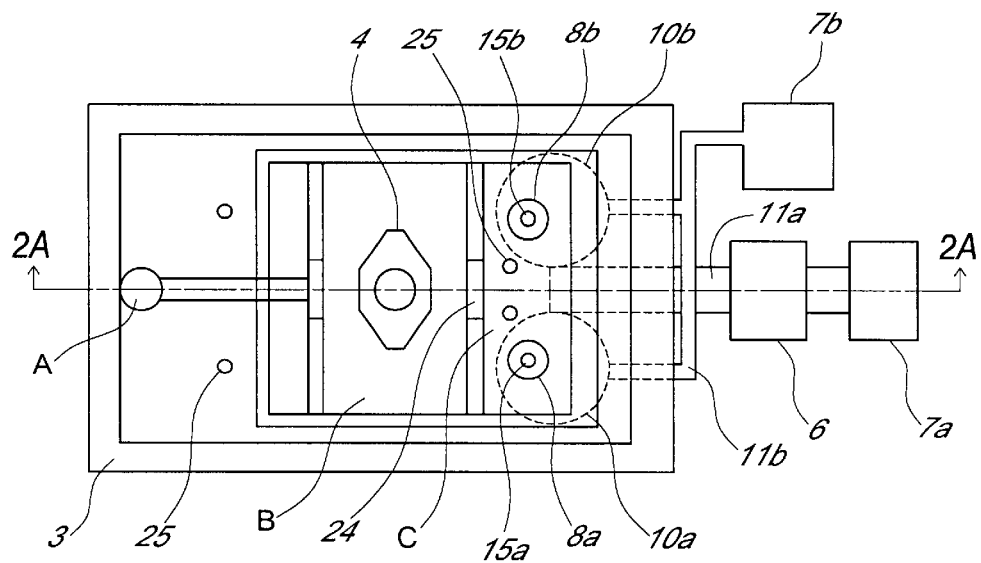

FIGS. 2(a) and 2(b) show an example of the apparatus comprising a radiant rube heater (25) by which the furnace is directly heated by exposing the heater in the furnace (FIG. 2(a) shows a cross-sectional side view along the line S–S' in FIG. 2(b), and FIG. 2(b) shows a partial cross-sectional plane view along the line T–T' in FIG. 2(a)). In FIGS. 2(a) and 2(b) show the example of the apparatus comprising an opening port on the upstream side wall in place of the baffle plate (12), an opening port at a higher position from the upstream side on the wall face at the downstream side, and a graphite vessel (24) a part of the upper face of which is covered.

Figure 3A:
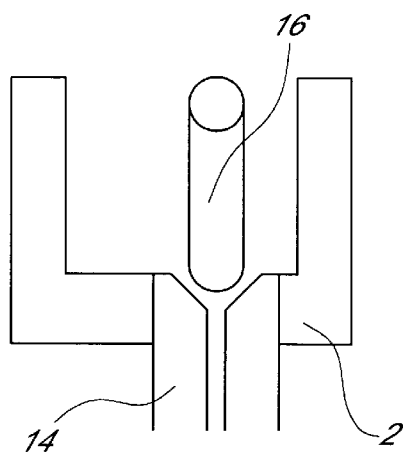
FIG. 3(a) illustrates an enlarged cross-sectional side view of the molten liquid fall-down pipe in the apparatus shown in FIG. 2(a)
Figure 3B:
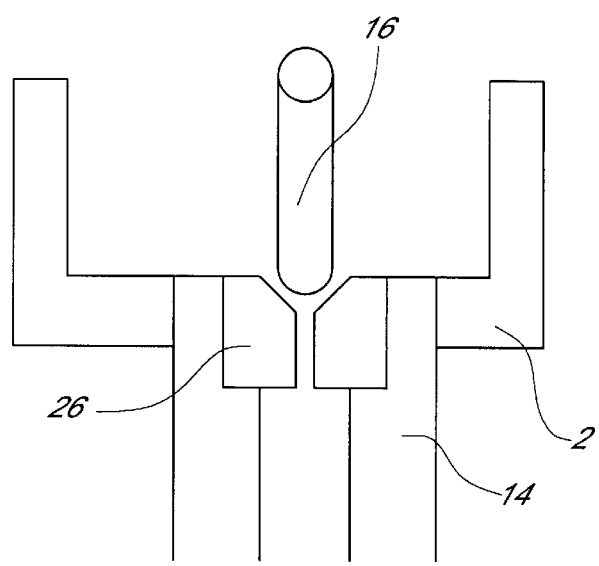
FIG. 3B illustrates an enlarged cross-sectional side view of the molten liquid fall-down nozzle that can be used in place of the molten liquid fall-down pipe.

FIG. 3(a) illustrates an enlarged cross-sectional side view of the molten liquid fall-down pipe in the apparatus shown in FIG. 2(a), and FIG. 3(b) illustrates an enlarged cross-sectional side view of the molten liquid fall-down nozzle that can be used in place of the molten liquid fall-down pipe. The reference numeral 26 in FIG. 3(b) denotes the molten liquid fall-down nozzle. It is an advantage of providing the molten liquid fall-down nozzle that maintenance of the apparatus is facilitated.

Figure 4A:
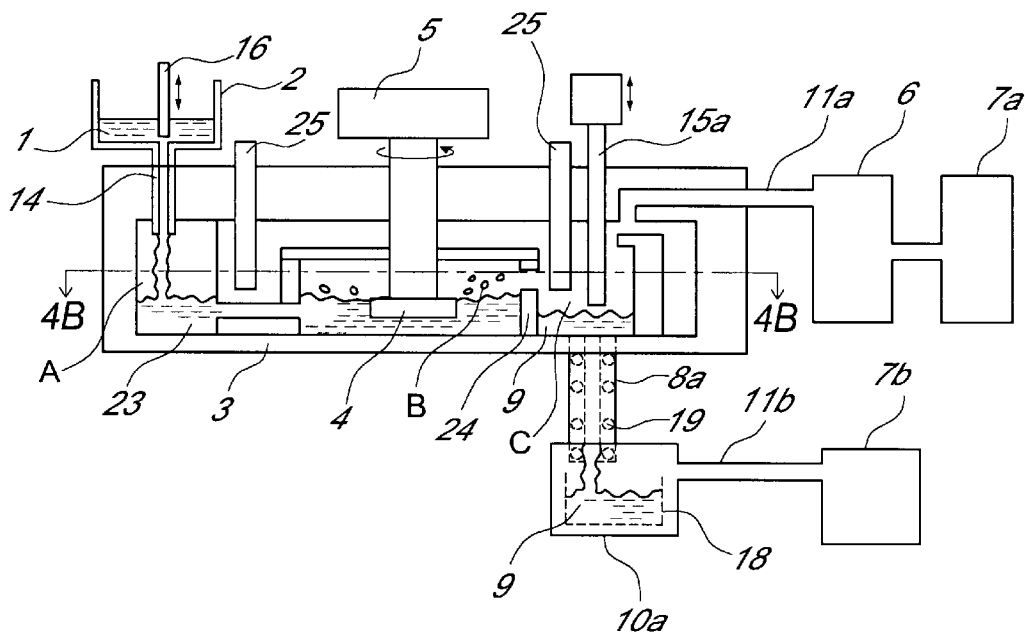
Figure 4B:
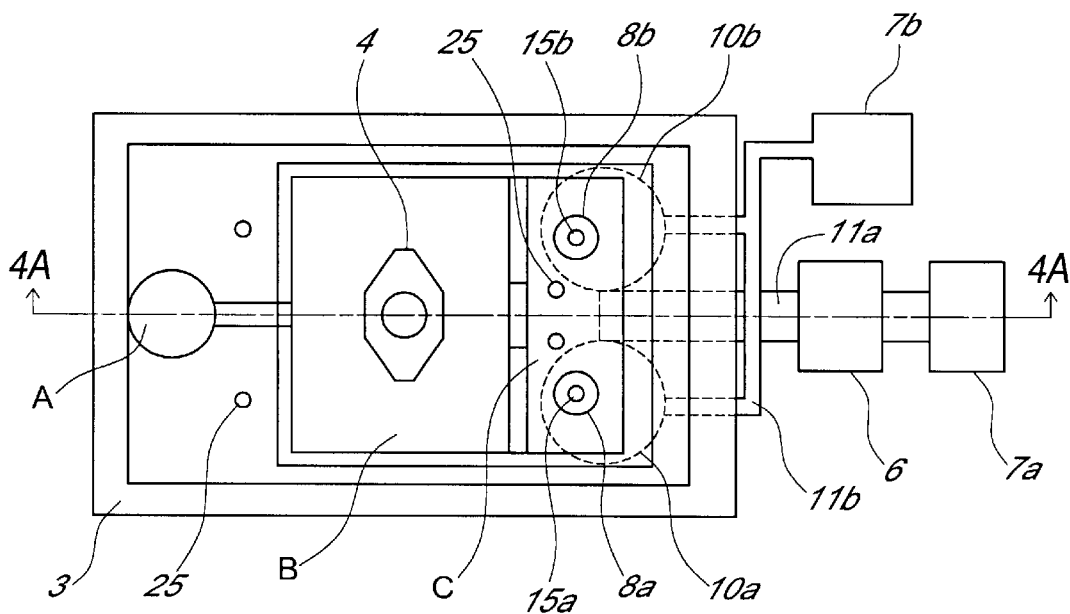

FIGS. 4(a) and 4(b) illustrate an example of the apparatus in which a basin (23) of the molten liquid is provided at the molten liquid fall-down portion (FIG. 4(a) shows a cross-sectional side view along the line S–S' in FIG. 4(b), and FIG. 4(b) shows a partial cross-sectional plane view along the line T–T' in FIG. 4(a)). The basin corresponds to the molten liquid receiver A in this example, and this molten liquid receiver A is connected to the molten liquid stirring part B with a pipe.

Figure 5A:
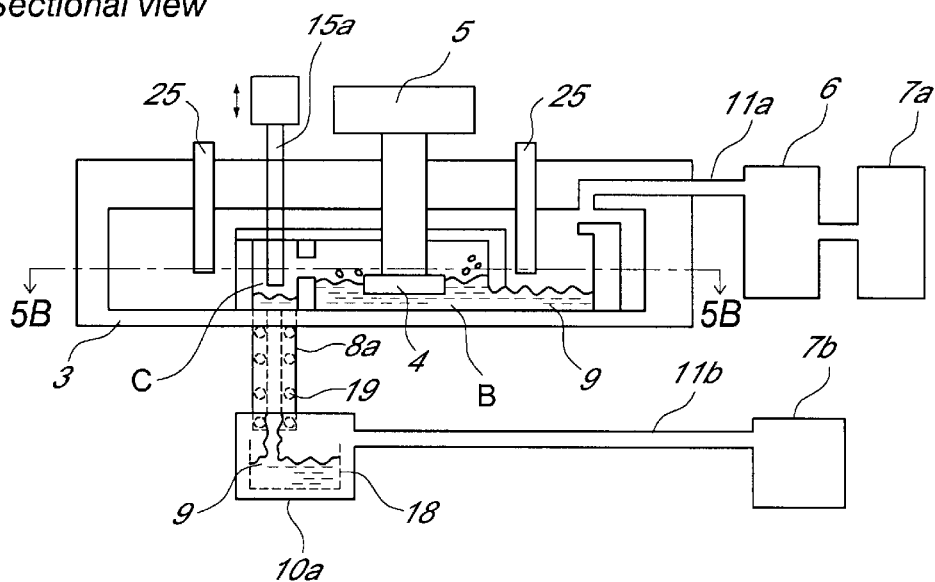
Figure 5B:
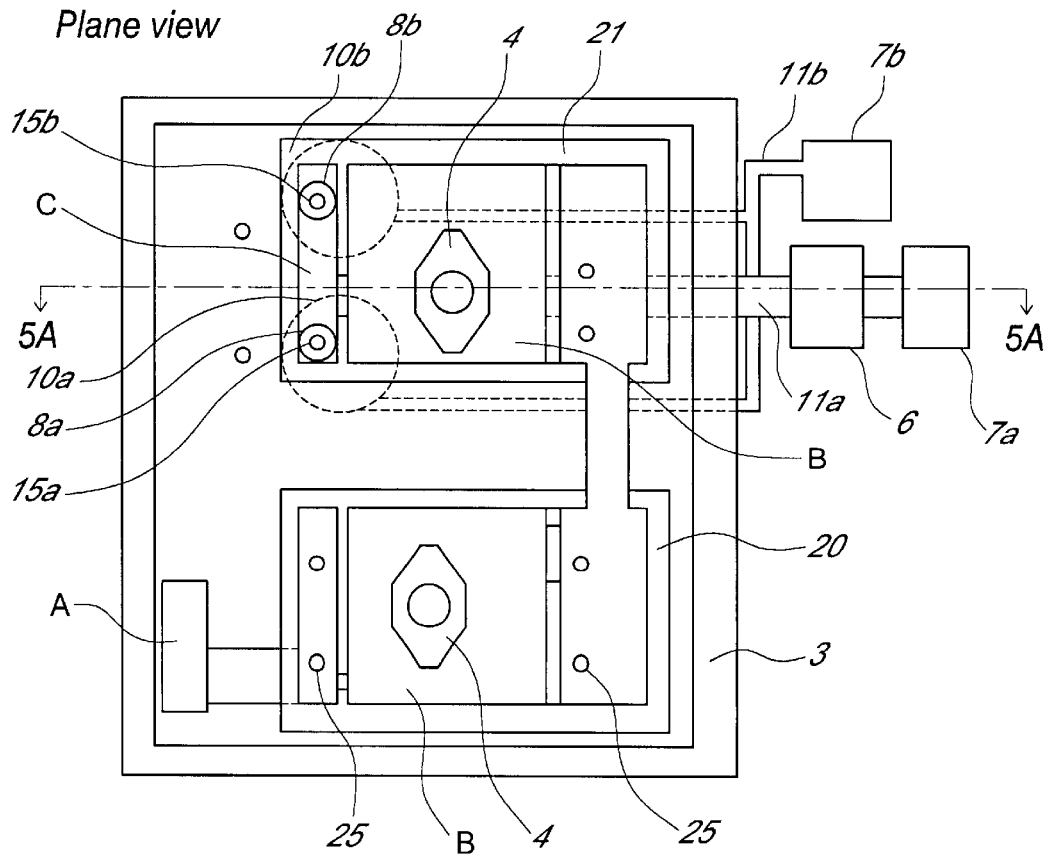

FIGS. 5(a) and 5(b) illustrate another example of the apparatus according to the present invention in which two molten liquid stirring parts B are disposed in one vacuum chamber, wherein FIG. 5(a) shows a cross-sectional side view along the line S–S' in FIG. 5(b), and FIG. 5(b) shows a partial cross-sectional plane view along the line T–T' in FIG. 5(a). The refined molten liquid is introduced into the receiving part of a processing vessel (21) from the molten liquid tapping part of another processing vessel (20). For facilitating feed of the molten liquid, the molten liquid receiver of the processing vessel (21) is placed lower than the molten liquid receiver of the processing vessel (20).

Figure 6A:
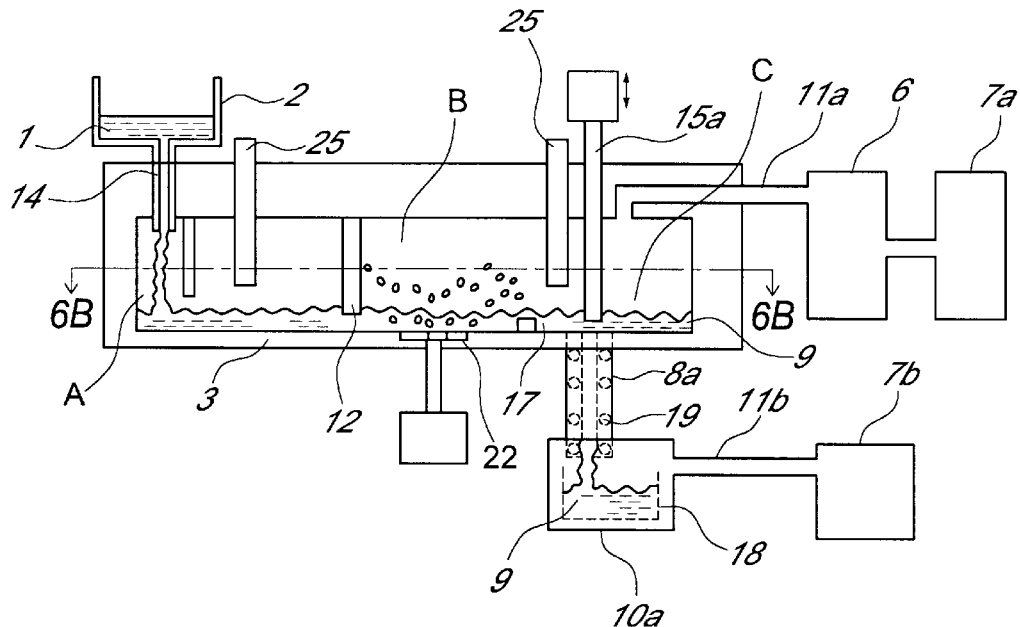
Figure 6B:
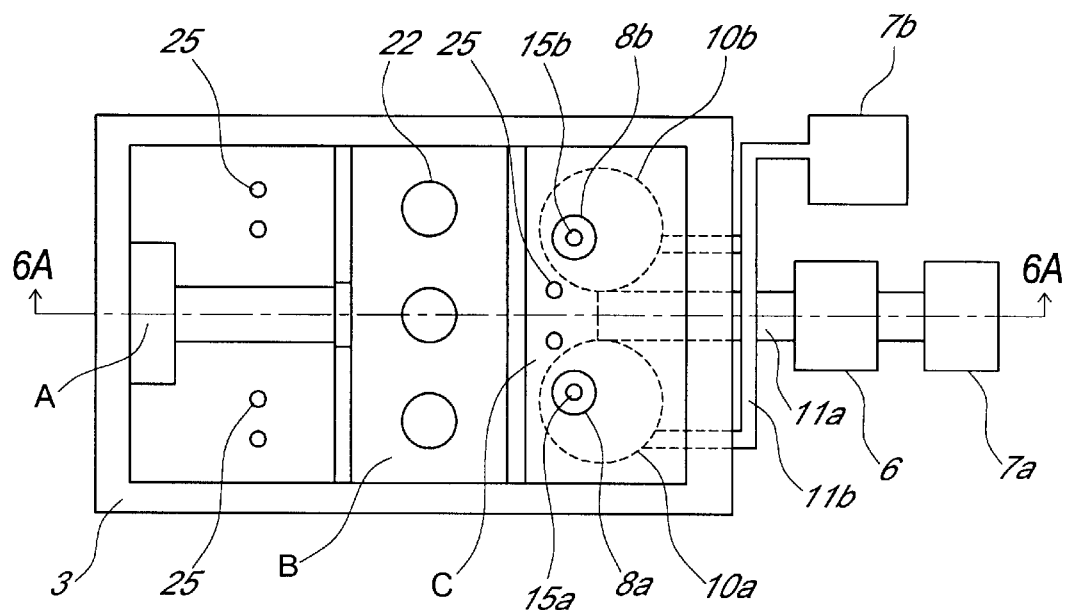
Figure 7:
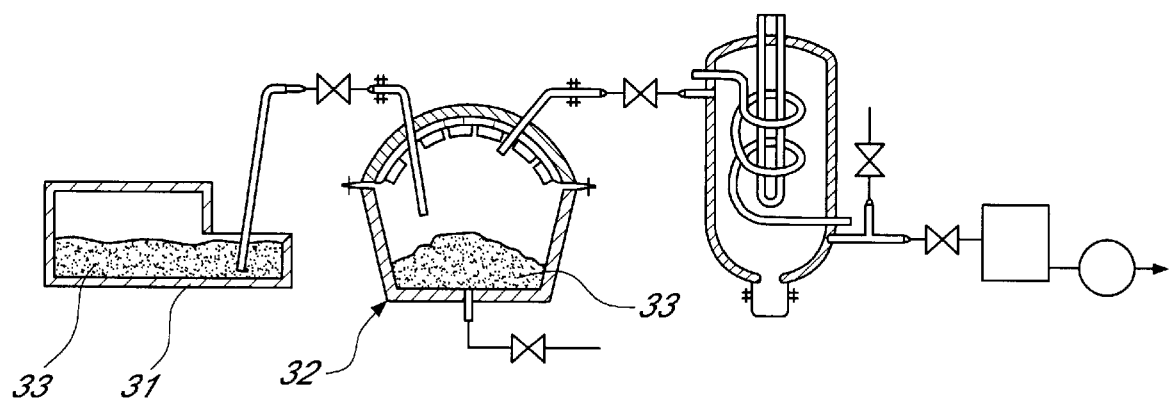
FIG. 7 illustrates an example of an apparatus for use in the conventional vacuum processing method.
Figure 8:
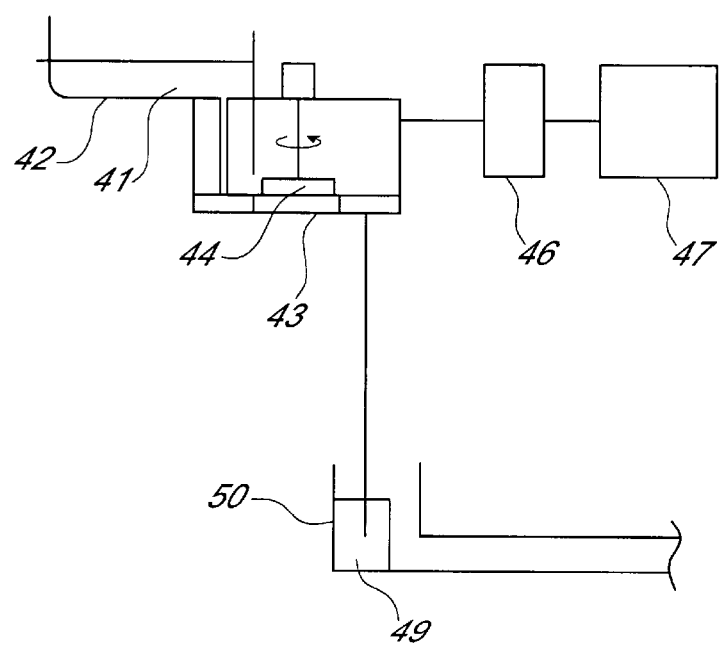
FIG. 8 illustrates another example of an apparatus for use in the conventional vacuum processing method.
Figure 9A:
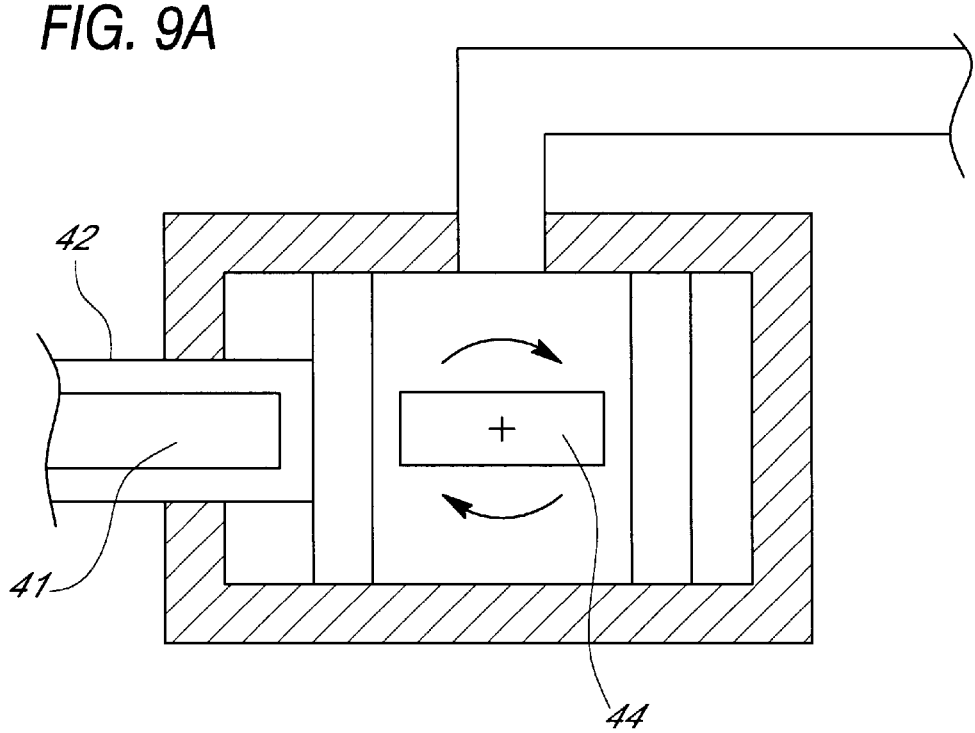
FIGS. 9(a) and 9(b) show a cross-sectional plane view and cross-sectional side view, respectively, of the apparatus for use in the vacuum processing method shown in FIG. 8.
Figure 9B:
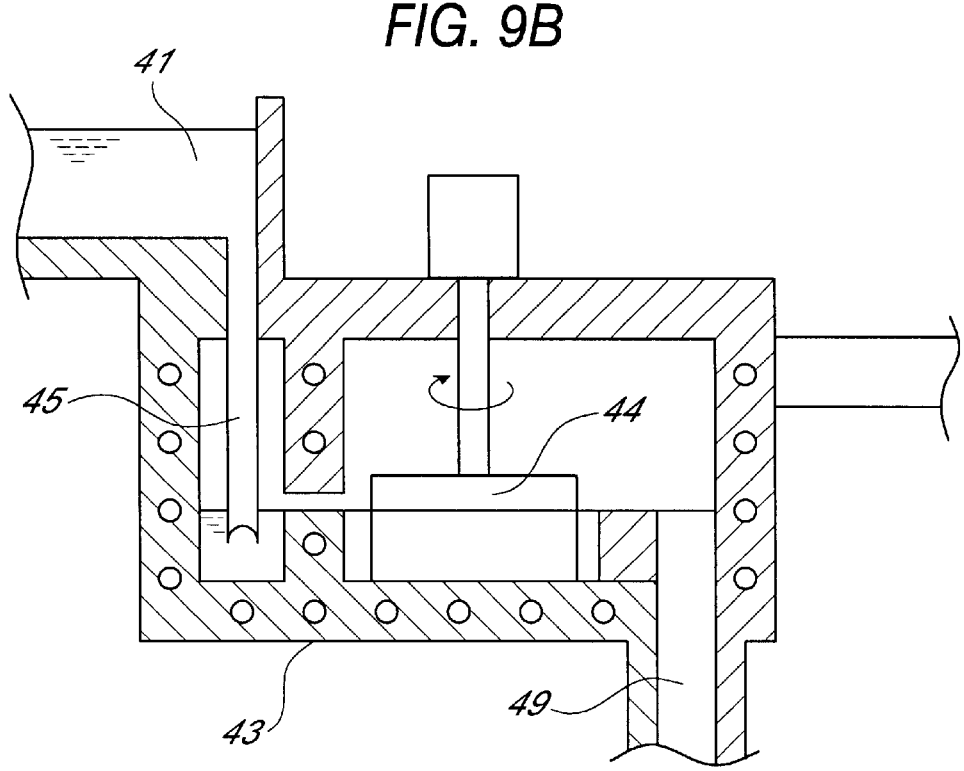

FIGS. 6(a) and 6(b) illustrate an example of the apparatus using an inert gas, wherein FIG. 6(a) shows a cross-sectional side view along the line S–S' in FIG. 6(b), and FIG. 6(b) shows a partial cross-sectional plane view along the line T–T' in FIG. 6(a). The inert gas is introduced using the radiant tube heater (25) and porous refractory material (22).

The same reference numerals in FIGS. 1(a) to 6(b) denote the same members.

A scrap of an aluminum heat exchanger was refined using the apparatus shown in FIGS. 2(a) and 2(b), and results of elimination of Zn and Mg, and hydrogen gas were measured. The feed port at the tip portion of the tundish (2) was plugged with a stopper (16). Then, temperature raising was started by putting an electric power source into the radiant tube heater (25) in the vacuum chamber (3) and into the heaters in the molten metal recovery pipes (8a) and (8b), followed by evacuating the vacuum chamber (3) and refined molten liquid recovery chambers (10a) and (10b). After confirming that the temperature and pressure reached 900° C. and 10 Pa, respectively, the graphite stirrer (4) (150 mm in width×500 mm in length) is allowed to rotate at 300 rpm. Then, the stopper (15a) of the recovery tube (8a) from the refined molten liquid recovery chamber (10a) is opened, and the stopper (15b) of the recovery tube (8b) from the refined molten liquid recovery chamber (10b) is closed. The molten liquid (1) of the aluminum scrap melted in the melting furnace is fed to the stopper part of the tundish through the tundish (2). After confirming that the molten liquid (1) of the aluminum scrap has sufficiently filled the tundish (2), the molten liquid (1) of the aluminum scrap without the tundish stopper (16) was introduced into the molten liquid receiver A of the vacuum chamber (3) at a flow speed of 70 kg/min through the molten liquid fall-down pipe (14) with an inner diameter of 10 mm. Simultaneously, the molten liquid (1) of the scrap was continuously guided from the melting furnace to the tundish (2). Consequently, the refined molten liquid (9) was discharged into the refined molten liquid recovery chamber (10a) by overflowing. The stopper (15a) is closed when a prescribed weight of the molten liquid is pooled in the recovery vessel (18) in the refined molten liquid recovery chamber (10a), the stopper (15b) is opened, and the refined molten liquid is simultaneously discharged by switching the vessel to the refined molten liquid recovery chamber (10b). Subsequently, the recovery vessel is pulled out of the chamber after returning the pressure of the refined molten liquid recovery chamber (10b) to the atmospheric pressure. After transferring all the refined molten liquid in the recovery vessel into another vessel, the recovery vessel is returned to the refined molten liquid recovery chamber (10b), and the pressure of the chamber is maintained at a prescribed pressure of 10 Pa. These procedures were repeated for every 30 minutes. Discharge of all the molten liquid of the scrap in the melting furnace was completed within 3 hours' experiment. The molten liquid could be recovered by coating the surface of the mold with a refractory material. The stopper (16) was closed when the elevation of the molten liquid in the tundish (2) is lowered (for example, 30 mm) for preventing the air from being mixed, followed by discharging the remaining molten liquid from a liquid discharge hole (not shown) provided at the tundish (2).

Table 1 shows the contents of Zn, Mg and hydrogen measured at 30 minute intervals.

TABLE 1

| TIME LAPSE (HOUR) | OUTLET OF MELTING FURNACE | | | REFINED MOLTEN LIQUID RECOVERY CHAMBER | | |
|---|---|---|---|---|---|---|
| | Zn (mass %) | Mg (mass %) | HYDROGEN GAS (ppm) | Zn (mass %) | Mg (mass %) | HYDROGEN GAS (ppm) |
| 0.5 | 1.46 | 0.18 | 0.41 | 0.014 | 0.001 | 0.06 |
| 1.0 | 1.51 | 0.19 | 0.38 | 0.011 | 0.001 | 0.05 |
| 1.5 | 1.58 | 0.18 | 0.40 | 0.012 | 0.001 | 0.06 |
| 2.0 | 1.49 | 0.19 | 0.42 | 0.012 | 0.001 | 0.06 |
| 2.5 | 1.46 | 0.19 | 0.39 | 0.013 | 0.001 | 0.05 |
| 3.0 | 1.50 | 0.21 | 0.35 | 0.014 | 0.001 | 0.05 |

As shown in Table 1, the method according to the present invention exhibited Zn and Mg elimination effects as well as a degassing effect for hydrogen while having an excellent stability.

Example 2

Scraps of the aluminum alloy were refined by changing the composition of the molten liquid of the scrap and processing conditions. While the apparatus shown in FIGS. 2(a) and 2(b) was the same as used in the refining process in Example 1, a molten liquid fall-down nozzle having a different diameter (see FIG. 3(b)) was attached in the molten liquid fall-down pipe (14). A graphite vessel (24) having opening ports at the lower part of the molten liquid receiver A and at the center of the wall surface at the molten liquid tapping part C, respectively, with a graphite cover on the upper surface, was attached in the vacuum chamber, which was divided into the molten liquid receiver A, molten liquid stirring part B and molten liquid tapping part C. Capacity of the apparatus was altered by changing the nozzle diameter to 5 mm, 10 mm or 14 mm. The assay results of Zn, Mg and hydrogen are shown in Table 2. Only the assay results of three hours lapse after processing are shown in the table, because little changes were observed with time as shown in Example 1.

TABLE 2

| No. | KIND OF SCRAPS | INITIAL ASSAY VALUE (mass %) HYDROGEN IN ppm | | | TEMPERATURE OF MOLTEN LIQUID (° C.) | REDUCED PRESSURE IN THE MOLTEN LIQUID STIRRER (Pa) | ROTATION SPEED OF STIRRER (rpm) | CAPACITY (t/Hr) | ASSAY VALUE OF REFINED MOLTEN LIQUID (mass %) HYDROGEN IN ppm | | |
|---|---|---|---|---|---|---|---|---|---|---|---|
| | | Zn | Mg | HYDROGEN | | | | | Zn | Mg | HYDROGEN |
| 1 | HEAT EXCHANGE SCRAP | 1.5 | 0.5 | 0.41 | 800 | 10 | 150 | 1.1 | 0.06 | 0.001 | 0.06 |
| 2 | | | | | 800 | 10 | 300 | 1.1 | 0.04 | 0.001 | 0.05 |
| 3 | | | | | 850 | 10 | 300 | 4.2 | 0.03 | 0.001 | 0.05 |
| 4 | | | | | 850 | 50 | 300 | 4.2 | 0.07 | 0.001 | 0.05 |
| 5 | | | | | 850 | 100 | 300 | 4.2 | 0.25 | 0.001 | 0.06 |
| 6 | | | | | 900 | 10 | 300 | 1.1 | 0.01 | 0.001 | 0.05 |
| 7 | | | | | 900 | 10 | 300 | 4.2 | 0.02 | 0.001 | 0.05 |
| 8 | | | | | 900 | 10 | 300 | 8.4 | 0.03 | 0.001 | 0.05 |
| 9 | | | | | 900 | 100 | 300 | 4.2 | 0.15 | 0.001 | 0.06 |
| 10 | USED CAR SCRAP | 3.0 | 0.5 | 0.51 | 900 | 100 | 300 | 4.2 | 0.16 | 0.001 | 0.06 |
| 11 | SASH SCRAP | 0.8 | 0.5 | 0.36 | 900 | 10 | 300 | 4.2 | 0.02 | 0.001 | 0.05 |
| 12 | 7000-SERIES SCRAP | 5.9 | 1.6 | 0.37 | 900 | 10 | 300 | 4.2 | 0.02 | 0.001 | 0.005 |

As shown in Table 2, the scraps were favorably refined.

The degree of refining was different depending on the rotation speed as shown in Table 2, because splashes of the molten liquid evidently appear as the rotation speed increases with changing contact state of the molten liquid with the vacuum atmosphere. Degree of refining was also different depending on the capacity of the apparatus, because residence time (reaction time) of the molten liquid in the vacuum chamber changes.

The processing conditions may be determined corresponding to the initial composition and final composition after the refining process. For reference, the core alloy of the heat exchanger usually have a composition of 0.10 mass % or less of Zn and 0.05 mass % or less of Mg, which is within the range of the processing ability of the present invention. The cast aluminum contains 0.3 mass % or less of Zn, and the die-cast aluminum contains 0.5 mass % or less of Zn. These aluminum alloys can be refined even by reducing the degree of vacuum and the temperature of the molten liquid.

INDUSTRIAL APPLICABILITY

The method according to the present invention is suitable for continuous vacuum refining of the molten liquids of optional alloys, particularly in the aluminum alloy and magnesium alloy having a small specific gravity that is liable to form high molten liquid columns due to differential pressures, and alloys a lot of scraps are generated.

The apparatus according to the present invention enables an efficient continuous vacuum refining process of alloys having small specific gravity without using any large scale facilities. Consequently, the apparatus is favorable as a continuous vacuum refining apparatus that is able to reduce construction costs and maintenance costs.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A continuous vacuum refining method of molten metals comprising the steps of:

eliminating impurities in a molten metal by evaporation by stirring the molten metal at a molten liquid stirring part in a vacuum chamber that has been previously evacuated and heated;

feeding the molten liquid into a molten liquid tapping part in the vacuum chamber from the molten liquid stirring part through a connecting hole;

and continuously discharging the molten liquid into a vessel in the evacuated refined molten liquid recovery chamber connected to a recovery passageway through the recovery passageway connected to the molten liquid tapping part for recovering the refined molten metal after returning the pressure to an atmospheric pressure, wherein a plurality of the recovery passageways and a plurality of the refined molten liquid recovery chambers connected to respective recovery passageways are provided, and the refined molten liquid recovery chambers for discharging the molten liquid through the recovery passageway are alternately switched.

2. The continuous vacuum refining method of molten metals according to claim 1, wherein the molten metal is continuously introduced into a molten liquid receiver in the vacuum chamber, followed by continuously feeding the molten liquid into the molten liquid stirring part from the molten liquid receiver through the connecting hole.

3. The continuous vacuum refining method of molten metals according to claim 1, wherein the refined molten liquid recovery chamber is evacuated to the same vacuum pressure as the vacuum pressure in the vacuum chamber for discharging the molten liquid.

4. The continuous vacuum refining method of molten metals according to claim 1, wherein the molten metal is scraps of an aluminum alloy or scraps of a magnesium alloy.

5. The continuous vacuum refining method of molten metals according to claim 1, wherein the molten liquid is stirred using a stirrer at the molten liquid stirring part.

6. A continuous vacuum refiner of molten metals comprising:

a molten liquid receiver for temporarily retaining a molten liquid introduced into a vacuum chamber comprising a preheating means from the outside of the vacuum chamber through a molten liquid fall-down port;

a molten liquid stirring part having a means for allowing the molten liquid to be temporarily retained and for stirring the molten liquid, and disposed so that the molten liquid communicates between the molten liquid receiver and the molten liquid stirring part; and a molten liquid tapping part disposed so that the molten liquid communicates between the molten liquid stirring part and the molten liquid tapping part, wherein a weir is provided for allowing the molten liquid in the molten liquid stirring part to overflow into the molten liquid tapping part, and a plurality of molten metal recovery pipes that transfers the overflowed molten liquid from the molten liquid tapping part into respective temporarily retaining vessels of the molten liquid in plural molten liquid recovery chambers placed at the outside of the vacuum chamber, are provided with their lower ends open in the molten liquid in the vessels, wherein each molten liquid recovery pipe has a capability of switching the refined molten liquid recovery chambers for discharging the molten liquid by providing stoppers for ON-OFF control of the flow speed of the molten liquid, and wherein an evacuation apparatus is connected to the vacuum chamber and refined molten liquid recovery chamber.

7. A continuous vacuum refiner of molten metals according to claim 6, wherein an opening port is provided at the upstream side of the molten liquid stirring part in place of the overflow weir, and an opening port located at a higher position from the upstream side opening port is provided on side walls at the downstream side, a vessel having a cover on at least a part of the upper area thereof being provided in the vacuum chamber.

8. The continuous vacuum refiner of molten metals according to claim 6, wherein stirring the molten metal in the molten liquid stirring part is selected from the group consisting of gas-bubbling and mechanical stirring.

9. The continuous vacuum refiner of molten metals according to claim 8 comprising a means for introducing an inert gas into the molten metal in the vicinity of the bottom part of the stirrer.

10. The continuous vacuum refiner of molten metals according to claim 6 comprising a porous refractory material on the bottom of the molten liquid stirring part, and a means for introducing an inert gas into the molten metal through the porous refractory material.

11. A continuous vacuum refiner of molten metals according to claim 6 comprising a molten metal feed pipe in place of a molten metal fall-down port of the molten liquid receiver.

12. The continuous vacuum refiner of molten metals according to claim 6, wherein the molten metal is an aluminum alloy scrap or a magnesium alloy scrap.

13. The continuous vacuum refiner of molten metals according to claim 6 comprising a radiant tube heater as a heating means in the molten metal stirring part.

14. The continuous vacuum refiner of molten metals according to claim 6, wherein at least one material selected from silicon nitride, graphite and silicon carbide is used for the stopper.

* * * * *